United States Patent
Kataoka et al.

(10) Patent No.: US 6,228,791 B1
(45) Date of Patent: May 8, 2001

(54) SOLID CATALYST COMPONENT AND CATALYST FOR OLEFIN POLYMERIZATION

(75) Inventors: Takuo Kataoka; Masayoshi Saito; Isa Nishiyama, all of Kanagawa (JP)

(73) Assignee: Toho Titanium Co., Ltd., Chigasaki (JP)

( * ) Notice: Subject to any disclaimer, the term of this patent is extended or adjusted under 35 U.S.C. 154(b) by 0 days.

(21) Appl. No.: 09/331,894

(22) PCT Filed: Oct. 29, 1998

(86) PCT No.: PCT/JP98/04907

§ 371 Date: Jul. 6, 1999

§ 102(e) Date: Jul. 6, 1999

(87) PCT Pub. No.: WO99/24476

PCT Pub. Date: May 20, 1999

(30) Foreign Application Priority Data

Nov. 6, 1997 (JP) .................................................. 9-320506
Feb. 25, 1998 (JP) .................................................. 10-060475

(51) Int. Cl.[7] ............................. B01J 21/00; B01J 21/02; B01J 21/06; B01J 21/10
(52) U.S. Cl. .......................... 502/115; 502/103; 502/108; 502/114; 502/116; 502/118; 502/127; 526/124.2; 526/126; 526/154
(58) Field of Search .................................... 502/103, 104, 502/108, 114, 115, 116, 118, 127

(56) References Cited

U.S. PATENT DOCUMENTS

| | | | | |
|---|---|---|---|---|
| 5,104,838 | * | 4/1992 | Fujita et al. | 502/108 |
| 5,547,912 | | 8/1996 | Kataoka et al. | 502/154 |
| 5,932,510 | | 8/1999 | Hosaka et al. | 502/127 |

FOREIGN PATENT DOCUMENTS

0376145 * 7/1990 (EP) ........................................ 4/656

* cited by examiner

Primary Examiner—Mark L. Bell
Assistant Examiner—Michael J. DiVerdi
(74) Attorney, Agent, or Firm—Oblon, Spivak, McClelland, Maier & Neustadt, P.C.

(57) ABSTRACT

The present invention is a solid catalyst component for polymerization of olefins prepared by contacting a magnesium compound, a tetravalent halogen-containing titanium compound, a diester of an aromatic dicarboxylic acid, an aromatic hydrocarbon and an organic aluminum compound containing a hydroxyl group represented by the following general formula $(R^1CO_2)_mAl(OH)_{3-m}$ or aluminum hydroxide. The catalyst for polymerization of olefins comprising said solid catalyst component, an organic aluminum compound represented by the general formula $R^2_pAlQ_{3-p}$ and an organic silicon compound represented by the general formula $R^3_qSi(OR^4)_{4-q}$ can retard the rate of forming a polymer having a low molecular weight or a low stereoregular polymer which is soluble in a polymerization solvent in slurry polymerization and can obtain a high stereoregular polymer in a high yield, and also can obtain a copolymer having an excellent property in a high yield in the copolymerization of olefins.

14 Claims, No Drawings

SOLID CATALYST COMPONENT AND CATALYST FOR OLEFIN POLYMERIZATION

TECHNICAL FIELD

The present invention relates to a solid catalyst component and catalyst for polymerization of olefins, which shows high activity and low rate for forming a polymer having a low molecular weight or a low stereoregularity which is soluble in a polymerization solvent and can provide a polymer having a high stereoregularity in a high yield, and further, can provide a copolymer having a excellent property in a high yield in copolymerization of olefins.

TECHNICAL BACKGROUND

Many proposals have been made and known for a solid catalyst component containing magnesium, titanium, an electron donor compound and halogen as essential components and a process for the polymerization or the co-polymerization of olefins in the presence of a catalyst for polymerization of olefins comprising said solid catalyst component, an organic aluminum compound and an organic silicon compound. For example, JP-A-57-63310 and JP-A-57-63311 (The term "JP-A" as used herein means an "unexamined published Japanese patent application") propose a process for polymerizing an olefin having 3 or more carbon atoms using a catalyst system comprising a solid catalyst component containing a magnesium compound, a titanium compound and an electron donor compound, an organic aluminum compound and an organic silicon compound having Si—O—C bond. However, these processes are not always satisfactory for obtaining highly stereoregular polymers in a high yield, and further improvement has been demanded.

JP-A-63-92614 discloses a solid catalyst component for polymerization of olefins prepared by bringing a dialkoxymagnesium, a diester of an aromatic dicarboxylic acid, an aromatic hydrocarbon, a titanium halide and calcium chloride into contact. On the other hand, JA-A-1-315406 discloses a catalyst system for polymerizing olefins comprising a solid catalyst component prepared by contacting titanium tetrachloride with a suspension formed by diethoxymagnesium with an alkylbenzene, adding phthalic dichloride thereto to react to obtain a solid product, and further contacting the resulting solid product with titanium tetrachloride in the presence of an alkylbenzene, an organic aluminum compound and an organic silicon compound, and a process for polymerizing olefins in the presence of said catalyst system. The foregoing known techniques focus on the development of a catalyst component having a high activity enough to allow the omission of a so-called deashing step, i.e., a step of removing catalyst residues such as chlorine and titanium remaining in the polymer produced as well as on the enhancement of the yield of stereoregular polymer or an improvement in durability of the catalyst activity during polymerization, and achieved excellent results to these purposes.

In the slurry polymerization process which requires a solvent at the polymerization, a polymer having a low molecular weight or a low stereoregularity, which is soluble in a polymerization solvent, is formed, especially in the polymerization of propylene, a polymer so-called "an atactic polypropylene" (hereinafter occasionally referred to as "APP") is formed. In case of increasing of the forming rate of the APP, it concerns about an undesirable effect to the operation of the process and the production cost of a polymer, because a pipeline may be blocked up during polymerization and a step for removal of APP from a high stereoregular polymer to be a product is required after polymerization. Further, in a copolymerization of olefins, for instance, in a random copolymerization of propylene and ethylene, a content of ethylene in a copolymer has to be increased and randomness has to be improved in order to increase the properties of the resulting copolymer. In case that a content of ethylene is increased, the aforementioned problems occur, because the rate for forming a soluble matter on a polymerization solvent tends to be high very much. However, the use of the catalyst of the foregoing known techniques is not enough to solve the problems.

The objective of the present invention is to solve the foregoing problems remaining in the prior art techniques and to provide a solid catalyst component and a catalyst for polymerization of olefins, which can control the rate of forming a polymer having a low molecular weight and a low stereoregular polymer which is soluble in a polymerization solvent and can obtain a high stereoregular polymer in a high yield, and also can obtain a copolymer having excellent properties in a high yield in the copolymerization of olefins.

DISCLOSURE OF THE INVENTION

As a result of extensive investigations to solve the foregoing problems remaining in the prior art techniques, the present inventors have found that when olefins are polymerized by using a catalyst preparing from a magnesium compound, a tetravalent halogen-containing titanium compound, a diester of an aromatic dicarboxylic acid, an aromatic hydrocarbon and an organic aluminum compound containing a hydroxyl group or aluminum hydroxide, a polymer having a low rate for forming a polymer a low molecular weight polymer or a low stereoregular polymer which is soluble in a polymerization solvent, especially an olefin based polymer having low APP formation rate can be obtained with maintaining a catalyst activity and a stereoregularity of the resulting polymer in a high level, and a copolymer having a excellent property can be obtained in a high yield in copolymerization of olefins with said solid catalyst component.

A solid catalyst component for polymerization of olefins (A) of the present invention to solve the foregoing objective comprises the following components (a) to (e);

(a) a magnesium compound,
(b) a tetravalent halogen-containing titanium compound,
(c) a diester of an aromatic dicarboxylic acid,
(d) an aromatic hydrocarbon and
(e) at least one aluminum compound selected from an organic aluminum compound containing a hydroxyl group represented by the following general formula (I) and aluminum hydroxide;

$$(R^1CO_2)_m Al(OH)_{3-m} \qquad (I)$$

wherein m represents 1 or 2, $R^1$ represents hydrogen atom or a linear or branched saturated or unsaturated hydrocarbon group having 1 to 21 carbon atom, and $CO_2$ represents —C(=O)—O—.

Further, the catalyst for polymerization of olefins of the present invention comprises:
(A) the foregoing solid catalyst component,
(B) an organic aluminum compound represented by the general formula:

$$R^2_p AlQ_{3-p}$$

wherein $R^2$ represents a $C_{1-4}$ alkyl group; Q represents a hydrogen or halogen atom; and p represents a real number of from more than 0 to not more than 3; and (C) an organic silicon compound represented by the general formula:

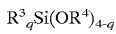
$$R^3_q Si(OR^4)_{4-q}$$

wherein $R^3$ represents a $C_{1-12}$-alkyl, cycloalkyl, phenyl, vinyl, allyl or aralkyl group which may be the same or different; $R^4$ represents a $C_{1-4}$-alkyl, cycloalkyl, phenyl, vinyl, allyl or aralkyl group which may be the same or different; and q represents 0 or an integer of from 1 to 3.

BEST EMBODIMENT FOR IMPLEMENTING THE INVENTION

Preferred examples of the magnesium compound (a) (hereinafter occasionally referred to as "component (a)") used for preparing a solid catalyst component (A) for polymerization of olefins of the present invention (hereinafter occasionally referred to as "solid catalyst component (A)") include magnesium dihalide, dialkylmagnesium, alkylmagnesium halide, dialkoxymagnesium, diaryloxymagnesium, alkoxymagnesium halide and fatty acid salt of magnesium, etc.

Examples of the magnesium dihalide include magnesium dichloride, magnesium dibromide, magnesium diiodide and magnesium difluoride, etc.

Preferred dialkyl magnesium is the compound represented by the general formula $R^5R^6Mg$ wherein $R^5$ and $R^6$ each represent a $C_{1-10}$ alkyl group which may be the same or different. Specific examples of such dialkylmagnesium include dimethylmagnesium, diethylmagnesium, methylethylmagnesium, dipropylmagnesium, methypropylmagnesium, ethylpropylmagnesium, dibutylmagnesium, methylbutylmagnesium and ethylbutylmagnesium, etc. Such dialkylmagnesium may be obtained by reacting magnesium metal with halogenated hydrocarbon or alcohol.

Preferred alkyl magnesium halide is the compound represented by the general formula $R^7MgD^1$ wherein $R^7$ represents a $C_{1-10}$ alkyl group, $D^1$ represents a halogen atom such as chlorine, bromine, iodine or fluorine. Specific examples of alkylmagnesium halide include ethylmagnesium chloride, propylmagnesium chloride, butylmagnesium chloride, etc. These magnesium halides may be obtained by reacting magnesium metal with halogenated hydrocarbon or alcohol.

Preferred dialkoxymagnesium or diaryloxymagnesium is the compound represented by the general formula $Mg(OR^8)(OR^9)$ wherein $R^7$ and $R^8$ may be the same or different and each represent a $C_{1-10}$ alkyl group or aryl group. Specific examples of dialkoxymagnesium or diaryloxymagnesium include dimethoxymagnesium, diethoxymagnesium, dipropoxymagnesium, dibutoxymagnesium, diphenoxymagnesium, ethoxymethoxymagnesium, ethoxypropoxymagnesium, butoxyethoxymagnesium, and diphenoxymagnesium, etc. These dialkoxymagnesium or diaryloxymagnesium may be obtained by reacting magnesium metal with alcohol in the presence of a halogen or a halogen-containing metal compound.

Preferred alkoxymagnesium halide is the compound represented by the general formula $Mg(OR^{10})D^2$ wherein $R^{10}$ represents a $C_{1-10}$ alkyl group and $D^2$ represents a halogen atom such as chlorine, bromine, iodine or fluorine. Specific examples of alkoxymagnesium halide include methoxymagnesium chloride, ethoxymagnesium chloride, propoxymagnesium chloride and butoxymagnesium chloride, etc.

Preferred fatty acid salt of magnesium is the compound represented by the general formula $(R^{11}COO)_2Mg$ wherein $R^{11}$ represents a $C_{1-20}$ hydrocarbon group. Specific examples of the fatty acid salt of magnesium include magnesium laureate, magnesium stearate, magnesium octanoate and magnesium decanoate, etc.

Among these magnesium compounds in the present invention, the dialkoxymagnesium is used preferably. Particularly preferred among these dialkoxymagnesiums is diethoxymagnesium or di-n-propoxymagnesium. The forgoing magnesium compounds may be used singly or in combination of two or more of them.

The dialkoxymagnesium may be used in granular or powder form to prepare the solid catalyst component (A) of the present invention. The particle shape of the dialkoxymagnesium may be amorphous or spherical. If a spherical particulate dialkoxymagnesium is used, a polymer powder having a better particle shape and a narrower particle size distribution can be obtained. Thus, the polymer powder produced can be easily handled during the polymerization, eliminating troubles such as blocking caused by the fine powder contained in the polymer powder produced.

The foregoing spherical particulate dialkoxymagnesium does not necessarily need to be truly spherical but may be ellipsoidal or pebble-like. In some detail, the shape of the particle is normally not more than 3, preferably from 1 to 2, more preferably from 1 to 1.5 as calculated in terms of the ratio of major axis length 1 to minor axis length w (1/W).

Further, the foregoing dialkoxymagnesium may have an average particle diameter of normally from 1 μm to 200 μm, preferably from 5 μm to 150 μm. The foregoing spherical particulate dialkoxymagnesium has an average particle diameter of normally from 1 μm to 100 μm, preferably from 5 μm to 50 μm, more preferably from 10 μm to 40 μm. Further, referring to its particle size, the foregoing dialkoxymagnesium preferably has a narrow particle size distribution comprising less fine and coarse powder. In some detail, it is preferred to have the particle size distribution comprising particles having a particle size of not more than 5 μm in an amount of not more than 20%, preferably not more than 10%, and particles having a particle size of at least 100 μm in an amount of not more than 10%, more preferably not more than 5%. The particle size distribution is not more than 3, preferably not more than 2 as calculated in terms of ln (D90/D10) wherein D90 represents the particle diameter at the point where the accumulated particle size reaches 90% and D10 represents the particle diameter at the point where the accumulated particle size reaches 10%.

The tetravalent halogen-containing titanium compound (b) (hereinafter occasionally referred to as "component (b)") to be used in the preparation of the solid catalyst component (A) of the present invention is preferably one or more of titanium halide or alkoxytitanium halide represented by the general formula $Ti(OR^{12})_nX_{4-n}$ wherein $R^{12}$ represents a $C_{1-4}$-alkyl group; X represents a halogen atom such as chlorine, bromine and iodine; and n represents 0 or an integer of from 1 to 3.

Specific examples of such a titanium compound include a titanium halide such as a titanium tetrahalide including titanium tetrachloride, titanium tetrabromide and titanium tetraiodide, an alkoxytitanium halide such as methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimrthoxy titanium chloride, triethoxy titanium chloride, tripropoxy titanium chloride and tri-n-butoxy titaniun chloride. Preferred among these titanium compounds is titanium tetrahalide. Particularly preferred is titanium tetrachloride. These titanium compounds may be used singly or in combination of two or more of them.

The diester of an aromatic dicarboxylic acid (c) (hereinafter occasionally referred to as "component (c)") to be used in the preparation of the solid catalyst component (A) of the present invention is preferably one or more of a diester of phthalic acid or a diester of terephthalic acid. Particularly prederred is one or more of a diester of phthalic acid or terephthalic acid having $C_{1-12}$ alkyl group.

Specific examples of these diesters of phthalic acid include dimethyl phthalate, diethyl phthalate, di-n-propyl phthalate, diisopropyl phthalate, di-n-butyl phthalate, diisobutyl phthalate, ethylmethyl phthalate, methylisopropyl phthalate, ethyl-n-propyl phthalate, ethyl-n-butyl phthalate, ethyl-isobutyl-phthalate, di-n-pentyl phthalate, diisopentyl phthalate, dihexyl phthalate, di-n-heptyl phthalate, di-n-octyl phthalate, bis(2,2-dimethylhexyl) phthalate, bis(2-ethylhexyl) phthalate, di-n-nonyl phthalate, diisodecyl phthalate, bis (2,2-dimethylheptyl) phthalate, n-butylisohexyl phthalate, n-butyl(2-ethylhexyl) phthalate, n-pentylhexyl phthalate, n-pentylisohexyl phthalate, isopentylheptyl phthalate, n-pentyl(2-ethylhexyl) phthalate, n-pentylisononyl phthalate, isopentyl(n-decyl) phthalate, n-pentylundecyl phthalate, isopentylisohexyl phthalate, n-hexyl(2,2-dimethylhexyl) phthalate, n-hexyl (2-ethylhexyl) phthalate, n-hexylisononyl phthalate, n-hexyl-n-decyl phthalate, n-heptyl(2-ethylhexyl) phthalate, n-heptylisononyl phthalate, n-heptylneodecylphthalate, and2-ethylhexylisononylphthalate. These diesters of phthalic acid may be used singly or in combination of two or more of them.

Specific examples of these diesters of terephthalic acid include dimethyl terephthalate, diethyl terephthalate, di-n-propyl terephthalate, diisopropyl terephthalate, di-n-butyl terephthalate, diisobutyl terephthalate, ethylmethyl terephthalate, methylisopropyl terephthalate, ethyl-n-propyl terephthalate, ethyl-n-butyl terephthalate, ethyl-isobutyl terephthalate, di-n-pentyl terephthalate, diisopentyl terephthalate, dihexyl terephthalate, di-n-heptyl terephthalate, di-n-octyl terephthalate, bis(2,2-dimethylhexyl) terephthalate, bis (2-ethylhexyl) terephthalate, di-n-nonyl terephthalate, diisodecyl terephthalate, bis(2,2-dimethylheptyl) terephthalate, n-butylisohexyl terephthalate, n-butyl(2-ethylhexyl) terephthalate, n-pentylhexyl terephthalate, n-pentylisohexyl terephthalate, isopentylheptyl terephthalate, n-pentyl(2-ethylhexyl) terephthalate, n-pentylisononyl terephthalate, isopentyl (n-decyl) terephthalate, n-pentylundecyl terephthalate, isopentylisohexyl terephthalate, n-hexyl(2-ethylhexyl) terephthalate, n-hexylisononyl terephthalate, n-hexyl-n-decyl terephthalate, n-heptyl(2-ethylhexyl) terephthalate, n-heptylisononyl terephthalate, n-heptylneodecyl terephthalate, and 2-ethylhexylisononyl terephthalate. These diesters of terephthalic acid may be used singly or in combination of two or more of them.

Among these diesters preferred are diesters of phthalic acid, more preferred are diethyl phthalate, di-n-propyl phthalate, di-iso-propyl phthalate, di-n-butyl phthalate, di-iso-butyl phthalate, di-n-octyl phthalate, bis(2-ethylhexyl)phthalate, and di-iso-decyl phthalate.

The aromatic hydrocarbon (d) (hereinafter occasionally referred to as "component (d)") to be used in the solid catalyst component (A) of the present invention is preferably a hydrocarbon of liquid state at a room temperature. Specific examples of these aromatic hydrocarbons are benzene, toluene, xylene, ethylbenzene, propylbenzene and trimrthylbenzene etc. More preferred are toluene, xylene and ethylbenzene. Further, an inert organic solvent other than the component (d) set force above can be used together. These inert organic solvents are a saturated hydrocarbon including hexane, heptane and cyclohexane, a halogenated hydrocarbon including orthodichlorobenzene, methylene chloride, carbon tetrachloride and dichloroethane.

In the organic aluminum compound containing a hydroxyl group or aluminum hydroxide (e) (hereinafter occasionally referred to as "component (e)") to be used in the preparation of the solid catalyst component (A) of the present invention, the organic aluminum compound containing a hydroxyl group is represented by the following general formula (I);

$$(R^1CO_2)_m Al(OH)_{3-m} \tag{I}$$

wherein m represents 1 or 2, $R^1$ represents a hydrogen atom or a linear or branched saturated or unsaturated hydrocarbon having 1 to 21 carbon atoms, and $CO_2$ represents —C(=O)—O—.

$R^1$ includes H, $CH_3$, $C_2H_5$, $C_3H_7$, $(CH_3)_2CHCH_2$, $CH_3CH=CH$, $CH_3(CH_2)_4$, $C_4H_9CH(C_2H_5)$, $CH_3(CH_2)_6$, $CH_2=CH(CH_2)_8$, $CH_3(CH_2)_8$, $C_{11}H_{23}$, $C_{13}H_{27}$, $C_{15}H_{31}$, $C_{17}H_{35}$, the following hydrocarbon groups;

$CH_3(CH_2)_7CH=CH(CH_2)_7$, $CH_3(CH_2)_4CH=CHCH_2CH=CH(CH_2)_7$, $C_{21}H_{43}$, etc.

Specific examples of the compounds of the foregoing general formula (I) includes $(HCO_2)Al(OH)_2$, $(HCO_2)_2Al(OH)$, $(CH_3CO_2)Al(OH)_2$, $(CH_3CO_2)_2Al(OH)$, $(C_2H_5CO_2)Al(OH)_2$, $(C_2H_5CO_2)_2Al(OH)$, $(C_3H_7CO_2)Al(OH)_2$, $(C_3H_7CO_2)_2Al(OH)$, $(CH_3)_2CHCH_2CO_2)Al(OH)_2$, $(CH_3)_2CHCH_2CO_2)_2Al(OH)$, $(CH_3CH=CHCO_2)Al(OH)_2$, $(CH_3CH=CHCO_2)_2Al(OH)$, $(CH_3(CH_2)_4CO_2)Al(OH)_2$, $(CH_3(CH_2)_4CO_2)_2Al(OH)$, $(C_4H_9CH(C_2H_5)CO_2)Al(OH)_2$, $(C_4H_9CH(C_2H_5)CO_2)_2Al(OH)$, $(CH_3(CH_2)_6CO_2)Al(OH)_2$, $(CH_3(CH_2)_6CO_2)_2Al(OH)$, $(CH_2=CH(CH_2)_8CO_2)Al(OH)_2$, $(CH_2=CH(CH_2)_8CO_2)_2Al(OH)$, $(CH_3(CH_2)_8CO_2)Al(OH)_2$, $(CH_3(CH_2)_8CO_2)_2Al(OH)$, $(C_{11}H_{23}CO_2)Al(OH)_2$, $(C_{11}H_{23}CO_2)_2Al(OH)$, $(C_{13}H_{27}CO_2)Al(OH)_2$, $(C_{13}H_{27}CO_2)_2Al(OH)$, $(C_{15}H_{31}CO_2)Al(OH)_2$, $(C_{15}H_{31}CO_2)_2Al(OH)$, $(C_{17}H_{35}CO_2)Al(OH)_2$, $(C_{17}H_{35}CO_2)_2Al(OH)$, an aluminum isostearate containing a hydroxyl group represented by the following general formula (II) or (III);

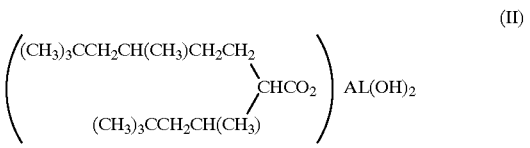

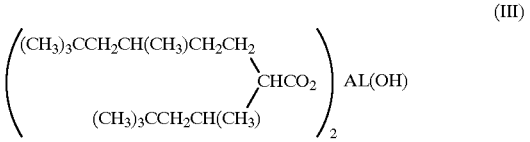

$(CH_3(CH_2)_7CH=CH(CH_2)_7CO_2)Al(OH)_2$, $(CH_3(CH_2)_7CH=CH(CH_2)_7CO_2)_2Al(OH)$, $(CH_3(CH_2)_4CH=CHCH_2CH=CH(CH_2)_7CO_2)Al(OH)_2$, $(CH_3(CH_2)_4$

CH=CHCH$_2$CH=CH(CH$_2$)$_7$CO$_2$)$_2$Al(OH), (C$_{21}$H$_{43}$CO$_2$)Al(OH)$_2$ (C$_{21}$H$_{43}$CO$_2$)$_2$Al(OH), etc.

Among these organic aluminum compounds containing a hydroxyl group, preferred are (CH$_2$CO$_2$)Al(OH)$_2$, (CH$_2$CO$_2$)$_2$Al(OH), (C$_{13}$H$_{27}$CO$_2$)Al(OH)$_2$, (C$_{13}$H$_{27}$CO$_2$)$_2$Al(OH), (C$_{15}$H$_{31}$CO$_2$)Al(OH)$_2$, (C$_{15}$H$_{31}$CO$_2$)$_2$Al(OH), (C$_{17}$H$_{35}$CO$_2$)Al(OH)$_2$, (C$_{17}$H$_{35}$CO$_2$)$_2$Al(OH), (CH$_3$(CH$_2$)$_7$CH=CH(CH$_2$)$_7$CO$_2$)Al(OH)$_2$, (CH$_3$(CH$_2$)$_7$CH=CH(CH$_2$)$_7$CO$_2$)$_2$Al(OH), (CH$_3$(CH$_2$)$_4$CH=CHCH$_2$CH=CH(CH$_2$)$_7$CO$_2$)Al(OH)$_2$, (CH$_3$(CH$_2$)$_4$CH=CHCH$_2$CH=CH(CH$_2$)$_7$CO$_2$)$_2$Al(OH), (C$_{21}$H$_{43}$CO$_2$)Al(OH)$_2$, (C$_{21}$H$_{43}$CO$_2$)$_2$Al(OH). More preferred is an aluminum mono- or di-hydroxide of a higher aliphatic carboxylic acid in which $R^1$ is a linear or branched $C_{15-21}$ saturated hydrocarbon group. Particularly preferred is an aluminum mono- or di-hydroxide of a stearic acid or isostearic acid in which $R^1$ is a linear or branched $C_{17}$ saturated hydrocarbon group. The aluminum mono- or di-hydroxide of isostearic acid includes aluminum mono- or di-hydroxide of 16-methylheptadecanic acid other than the foregoing compounds. These compounds may be a mixture of two or more of the compounds. For instance, for a stearic acid salt of aluminum hydroxide, a mixture of the salt of aluminum mono-hydroxide and aluminum di-hydroxide may be used.

As the component (e) to be used in the preparation of the solid catalyst component (A) of the present invention, aluminum hydroxide (Al(OH)$_3$) is also used other than the foregoing organic aluminum compound containing a hydroxyl group. The property of aluminum hydroxide is not specifically limited, but a powdery or granular type may be used. Preferably, dehydration and degassing treatments such as drying in vacuum are conducted before using in the preparation of the solid catalyst component (A).

The foregoing component (e) may be used singly or in combination of two or more of them. The component (e) may be used by suspending in a hydrocarbon compound, for example, an aromatic hydrocarbon such as benzene, toluene, xylene, ethylbenzene, propylbenzene, and trimethylbenzene, a saturated hydrocarbon such as hexane, heptane, and cyclohexane and a halogenated hydrocarbon such as orthodichlorobenzene, methylene chloride, carbon tetrachloride and dichloroethane.

In the present invention, the foregoing component (e) is an essential component in the preparation of the solid catalyst component. If the component is not used, it is difficult to not only control the rate of forming a polymer which is soluble in a polymerization solvent, but also obtain a preferable effect in a bulk density and a stereoregularity of the resulting polymer.

In the preparation process of the solid catalyst component (A) of this invention, a polysiloxane may be used other than the forgoing components (a) to (e). As polysiloxanes there may be used one or more compounds represented by the following general formula (IV);

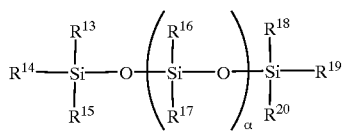

(IV)

In the foregoing general formula, a represents an average polymerization degree of from 2 to 30,000. Most of $R^{13}$ to $R^{20}$ each represents a methyl group, and some of $R^{13}$ to $R^{20}$ may be substituted with a phenyl group, hydrogen atom, $C_{10-20}$ higher fatty acid residue, epoxy-containing group or $C_{1-10}$ polyoxyalkylene group. The compound represented by the forgoing general formula may form a cyclic polysiloxane in which $R^{16}$ and $R^{17}$ each are methyl group.

The polysiloxane is known generically as silicone oil. It is a chain, partial hydrogenated, cyclic or denatured polysiloxane having a viscosity of from 2 to 10,000 cSt, preferably from 3 to 500 cSt, at 25° C. which stays liquid or viscous at a room temperature.

Specific examples of the polysiloxane are dimethyl polysiloxane and methyl phenyl polysiloxane as a chain polysiloxane, methyl hydrogen polysiloxane of which the rate of hydrogenation is 10 to 80% as a partial hydrogenated polysiloxane, hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane as a cyclic polysiloxane and higher fatty acid-substituted dimethylsiloxane, epoxy-substituted dimethylsiloxane, and polyoxyalkylene-substituted dimethylsiloxane as a denatured polysiloxane.

By using the polysiloxane described above in the preparation of a solid catalyst component (A), a bulk density and a stereoregularity of the resulting polymer can be improved.

The foregoing solid catalyst component (A) can be prepared by contacting an organic aluminum compound containing a hydroxyl group or aluminum hydroxide, a magnesium compound, a tetravalent halogen-containing titanium compound, a diester of an aromatic dicarboxylic acid, an aromatic hydrocarbon and a polysiloxane if necessary.

Examples of methods for preparing the solid catalyst component (A) include the method for obtaining a solid component by precipitating a solid matter by contacting an organic aluminum compound containing a hydroxyl group or aluminum hydroxide, a diester of an aromatic dicarboxylic acid, a tetravalent halogen-containing titanium compound and an aromatic hydrocarbon, or heat treatment with the solution of the forgoing magnesium compound dissolved in a alcohol or a titanium compound; and the method for obtaining a solid component by contacting and treating the suspension of a magnesium compound in a tetravalent halogen-containing titanium compound or an inert hydrocarbon solvent with an organic aluminum compound containing a hydroxyl group, an aromatic hydrocarbon and a diester of an aromatic dicarboxylic acid, and further contacting with a titanium compound if necessary. Among the above-mentioned methods, the particles of the solid component obtained by the former method is almost spherical and have a narrow particle size distribution. And, in the latter method, by using a spherical magnesium compound, the solid catalyst component having a spherical particle and narrow particle size distribution can be obtained. Moreover, the solid component having a spherical particle and narrow particle size distribution can be also obtained without using the spherical magnesium compound, for example, by forming a particle by so called a "spray-drying method" in which a solution or a suspension is sprayed and dried by using a spraying apparatus.

The contact for each component is conducted under an atmosphere of an inert gas and a condition of eliminating water, etc. with stirring in a vessel with agitator. The temperature for contacting can be set up at relatively low temperature range of around room temperature in the case of simply mixing with stirring after contacting or conducting a denatured treatment by dispersing or suspending. However, in the case of obtaining a product by reacting after contacting, the temperature for contacting is preferably at the temperature range from 40 to 130° C. If the temperature at reaction is less than 40° C., such reaction is not proceeded completely and the efficiency of the resulting solid component becomes insufficient. If the temperature of the reaction exceeds 130° C., the reaction is hard to control because the solvent used in reaction vaporizes extremely. The time for reaction is usually 1 minute or more, preferably 10 minutes or more, more preferably 30 minutes or more.

Typical methods for preparing solid catalyst component (A) are described below:

(1) Metallic magnesium powder, an alkyl monohalide, and iodine are contacted and reacted to synthesize an organic magnesium compound. The resulting reaction product, a tetra-alkoxytitanium, an acid halide, and an aliphatic alcohol are contacted in the presence of a saturated hydrocarbon to form a uniform solution. A tetravalent halogen-containing titanium compound and an aromatic hydrocarbon are contacted and reacted with the solution to precipitate a solid product. The solid product is brought into contact with a diester of an aromatic dicarboxylic acid and an organic aluminum compound containing a hydroxyl group or aluminum hydroxide to prepare solid catalyst component (A).

(2) Metallic magnesium, butyl chloride, and dibutyl ether are allowed to react to synthesize an organomagnesium compound. The organo-magnesium compound is brought into contact with tetrabutoxy-titanium and tetraethoxy-titanium to obtain a solid product, which is then brought into contact with a diester of an aromatic dicarboxylic acid, dibutyl ether, a tetravalent halogen-containing titanium compound, an aromatic hydrocarbon, and an organic aluminum compound containing a hydroxyl group or aluminum hydroxide to prepare solid catalyst component (A). The resulting solid component may be subjected to a polymerization treatment with an organic aluminum compound, an organosilicon compound, and an olefin.

(3) A hydrogenated magnesium compound, an alkoxy titanium compound, e.g., tetrabutoxy titanium, a diester of an aromatic dicarboxylic acid, an aliphatic hydrocarbon and an aliphatic alcohol are contacted and reacted to form a uniform solution, which is then dropped into a tetravalent halogen-containing titanium compound to precipitate a solid component. Further, the solid product is brought into contact with a diester of an aromatic dicarboxylic acid and then contact with a tetravalent halogen-containing titanium compound and an organic aluminum compound containing a hydroxyl group or aluminum hydroxide in the presence of an aromatic hydrocarbon to prepare solid catalyst component (A).

(4) A dialkoxymagnesium, e.g., diethoxymagnesium is brought into contact with a diester of an aromatic dicarboxylic acid and an aromatic hydrocarbon, which is then co-ground at a low temperature below 10° C. The co-ground material is brought into contact with a tetravalent halogen-containing titanium compound and an organic aluminum compound containing a hydroxyl group or aluminum hydroxide to prepare solid catalyst component (A).

(5) A calcium halide and a fatty acid salt of magnesium, e.g., magnesium stearate, are contacted and reacted with a tetravalent halogen-containing titanium compound and an aromatic dicarboxylic acid diester, an aromatic hydrocarbon and an organic aluminum compound containing a hydroxyl group or aluminum hydroxide to prepare solid catalyst component (A). The solid catalyst component may be brought into contact with an organic aluminum or water.

(6) A fatty acid salt of magnesium, a dialkoxymagnesium, a diester of an aromatic dicarboxylic acid, e.g., di-iso-butyl phthalate, an aromatic hydrocarbon and an organic aluminum compound containing a hydroxyl group or aluminum hydroxide are suspended in a halogenated hydrocarbon. The suspension is then dropped into a tetravalent halogen-containing titanium compound and subjected to a contact treatment to prepare solid catalyst component (A).

(7) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with a tetravalent halogen-containing titanium compound. In any step of the forgoing contact or contacting reaction, a diester of an aromatic dicarboxylic acid is contacted to prepare solid catalyst component (A). In the foregoing step, a polysiloxane may be used.

(8) A dialkoxy magnesium, e.g., diethoxymagnesium and a diester of an aromatic dicarboxylic acid are suspended in an aromatic hydrocarbon, and the suspension is added to a tetravalent halogen-containing titanium compound to obtain a solid product. The solid product is washed with an aromatic hydrocarbon, and further contacted with a tetravalent halogen-containing titanium compound and an organic aluminum compound containing a hydroxyl group or aluminum hydroxide in the presence of an aromatic hydrocarbon to prepare solid catalyst component (A). In the foregoing step, a polysiloxane may be used.

(9) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid and an inorganic salt, e.g., calcium chloride are contacted to prepare solid catalyst component (A).

(10) A dialkoxymagnesium, e.g., diethoxymagnesium and a calcium compound, e.g., calcium chloride are co-ground, and the resulting grinds are suspended in an aromatic hydrocarbon. The suspension is brought into contact with a tetravalent halogen-containing titanium compound and an diester of aromatic dicarboxylic acid, and the product is further contacted with a tetravalent halogen-containing titanium compound and an organic aluminum compound containing a hydroxyl group or aluminum hydroxide to prepare solid catalyst component (A). In the foregoing step, a silicon compound represented by the general formula $Si(OR^{21})_4$ (wherein $R^{21}$ is an alkyl group or an aryl group) may be coexisted.

(11) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and repeated the contact with the titanium compound. In any step of the forgoing contact or contacting reaction, a diester of an aromatic dicarboxylic acid and a surface active agent are contacted to prepare solid catalyst component (A).

(12) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid is contacted to prepare solid component. The resulting solid component is subjected to a heat treatment in the presence or absence of a hydrocarbon solvent to prepare solid catalyst component (A). In the foregoing step, a halogenated hydrocarbon may be coexisted.

(13) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid and water are contacted to prepare solid catalyst component (A). In the foregoing step, a halogenated hydrocarbon may be coexisted.

(14) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid and an organic aluminum compound are contacted to prepare solid catalyst component (A). In the foregoing step, an electron donor compound other than a diester of an aromatic dicarboxylic acid, e.g., an organic silicon compound may be used.

(15) A dialkoxy magnesium, e.g., diethoxymagnesium is suspended in an aromatic hydrocarbon, and the resulting suspension is brought into contact with a tetravalent halogen-containing titanium compound, and the mixture is heated and contacted with two or more diesters of an aromatic dicarboxylic acid different in the carbon atom number of the alkyl moiety to obtain a solid product. The resulting solid product is washed with an alkylbenzene and further contacted with a tetravalent halogen-containing titanium compound and an organic aluminum compound containing a hydroxyl group or aluminum hydroxide in the presence of the aromatic hydrocarbon to prepare solid catalyst component (A). In the above preparation, when the solid product is brought into contact with the second titanium compound, it may again contacted with two or more diesters of an aromatic dicarboxylic acid different in the carbon atom number of the alkyl group. In the foregoing step, a polysiloxane may be contacted.

(16) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid and an aluminum compound represented by the general formula $Al(OR^{22})_r X_{3-r}$ (wherein $R^{22}$ is a $C_{1-4}$-alkyl group or an aryl group, X represents a halogen atom and r represents 0 or an integer of from 1 to 3) are contacted to prepare solid catalyst component (A). In the foregoing step, a polysiloxane may be contacted.

(17) A dialkoxy magnesium, e.g., diethoxymagnesium, a tetravalent halogen-containing titanium compound and a diester of an aromatic dicarboxylic acid are contacted in the presence of an aromatic hydrocarbon to form a solution, which is then formed into a solid product. The resulting solid product is brought into contact with a tetravalent halogen-containing titanium compound and an organic aluminum compound containing a hydroxyl group or aluminum hydroxide to prepare solid catalyst component (A). In the foregoing step, a polysiloxane may be contacted.

(18) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid and a polycarbonyl compound are contacted to prepare solid catalyst component (A). In the foregoing step, a polysiloxane may be contacted.

(19) A dialkoxy magnesium, e.g., diethoxymagnesium is suspended in an aromatic hydrocarbon, which is then brought into contact with a tetravalent halogen-containing titanium compound and an organic aluminum compound containing a hydroxyl group or aluminum hydroxide and, if necessary, repeated the contact with the titanium compound. In any step of the forgoing contact or contacting reaction, a diester of an aromatic dicarboxylic acid and a momo or polyhydric alcohol are contacted to prepare solid catalyst component (A). In the foregoing step, an aluminum compound, e.g., aluminum chloride or a polysiloxane may be contacted.

(20) Two or more of the solid catalyst component prepared by the foregoing method (1) to (19) are mixed to prepare solid catalyst component (A).

In the foregoing preparation methods, preferable methods for contacting the component (e) are described below;

(i) Component (a) is brought into contact with component (e) in the presence of component (b) or (d):

(a)→(b)→(e), or (a)→(d)→(e)

(ii) Component (a) is brought into contact with component (e) in the presence of component (b) and (d):

(a)→(b)→(d)→(e), or (a)→(d)→(b)→(e)

(iii) A solid reaction product X, which is formed by contacting component (a) with component (b), (c) and (d), is brought into contact with component (e) in the presence of component (b) and/or component (d):

(a)→(b)→(c)→(d)→a solid reaction product X→(b')→(e)

(a)→(b)→(c)→(d)→a solid reaction product X→(d')→(b')→(e), etc.

wherein component (b') and component (d') may be a residue of component (b) and component (d) in the preparation of a solid catalyst component or component (b) and component (d) which are newly added.

The temperature for contacting a component (e) is −20 to 130° C., preferably −10 to 100° C., more preferably 0 to 80° C.

In the foregoing preferable contact method, the contact of component (e) with component (a) or a solid reaction product X is conducted preferably in a suspended state. In the case, preferably the contact is conducted by suspending component (a) or a solid reaction product X in component (b) or component (d), more preferably, the contact is conducted by suspending component (a) or a solid reaction product X in component (d). Specifically, further contacting component (b) is preferable after contacted component (e) with component (a) or a solid reaction product X in the suspended state. Comparing to a contact method, e.g., a grind in a dry state, a contact in the suspended state has good effects including showing high activity and low rate for forming a polymer having a low molecular weight or a low stereoregularity which is soluble in a polymerization solvent, and it is preferable in the sense of achieving the objective of the present invention.

Based on the foregoing description, the preferable order of contact in the preparation of solid catalyst component (A) is as follows;

(1) (a)→(b)→(e)→(d)→(c)→(solid reaction product Y)→(b)→(solid catalyst component)
(2) (a)→(b)→(e)→(d)→(c)→(solid reaction product Y)→(b)→(c)→(solid catalyst component)
(3) [(a)+(d)]→(e)→(b)→(c)→(solid reaction product Y)→(d)→(b)→(solid catalyst component)
(4) [(a)+(d)]→(e)→(b)→(c)→(solid reaction product Y)→(d)→(b)→(c)→(solid catalyst component)
(5) [(a)+(e)+(d)]→(b)→(c)→(solid reaction product Y)→(d)→(b)→(solid catalyst component)
(6) [(a)+(e)+(d)]→(b)→(c)→(solid reaction product Y)→(d)→(b)→(c)→(solid catalyst component)

(7) [(a)+(d)]→(b)→(c)→(solid reaction product X)→(d')→(b')→(e)→(solid catalyst component)
(8) [(a)+(d)]→(b)→(c)→(solid reaction product X)→(d')→(b')→(e)→(c)→(solid catalyst component)
(9) [(a)+(d)+(c)]→(b)→(solid reaction product X)→(d')→(b')→(e)→(solid catalyst component)
(10) [(a)+(d)+(c)]→(b)→(solid reaction product X)→(d')→(b')→(e)→(c)→(solid catalyst component)
(11) [(a)+(d)+(c)]→[(b)+(d)]→(solid reaction product X)→(d')→(b')→(e)→(solid catalyst component)
(12) [(a)+(d)+(c)]→[(b)+(d)]→(solid reaction product X)→(d')→(b')→(e)→(c)→(solid catalyst component)

wherein component (b') and component (d') may be a residue of component (b) and component (d) in the preparation of a solid catalyst component or component (b) and component (d) which are newly added. Solid reaction product X is the reaction product of component (a) to (d), and solid reaction product Y is the reaction product of components (a) to (e).

Preferred examples of the process for the preparation of the solid catalyst component (A) used in the present invention will be given below:

(1) A magnesium compound (a), e.g., diethoxymagnesium is suspended in component (d), e.g., toluene to form a suspension. To the suspension thus obtained is brought into contact with component (b), e.g., titanium tetrachloride. Preferably, to conduct a aging reaction at −20 to 50° C., preferably 0 to 50° C., more preferably 0 to 40° C. for 1 to 120 minutes, preferably 10 to 100 minutes, more preferably 20 to 80 minutes. After the procedure, the suspension is heated and reacted at 0 to 130° C., preferably 40 to 130° C., more preferably 60 to 120° C. for 1 to 600 minutes, preferably 10 to 500 minutes, more preferably 30 to 400 minutes. In the procedure, before or after the suspension is brought into contact with component (b), one or two or more of component (c), e.g., a phthalic acid diester is contacted at 0 to 130° C., preferably 10 to 100° C., more preferably 20 to 90° C. In the procedure, preferably, two kinds of a phthalic diester are used, and one of these diester is contacted at 30 to 60° C., and another is contacted at 60 to 90° C. Further, preferable is to contact a polysiloxane before or after the suspension is brought into contact with component (c). The suspension is further brought into contact with component (b), if necessary, in the presence of component (d) to obtain a solid reaction product. The solid reaction product may be washed with an aromatic hydrocarbon compound which states liquid at a room temperature, and suspended in component (d) and brought into contact with components (e) and (b) at −20 to 130° C., preferably −10 to 100° C., more preferably 0 to 80° C., reacted at 0 to 130° C., preferably 40 to 130° C., more preferably 60 to 120° C., for 1 to 600 minutes, preferably 10 to 500 minutes, more preferably 30 to 400 minutes. In the procedure, one or more of component (c) may be brought into contact with the solid reaction product before or after components (e) and (b) are brought into contact with the solid reaction product. Then, if necessary, component (b) may be further contacted in the presence of component (d). The solid reaction product is washed with a hydrocarbon which is liquid at a room temperature to obtain solid catalyst component (A).

(2) Components (a) and (e) are suspended in component (d) at −20 to 130° C., preferably −10 to 100° C., more preferably 0 to 80° C. and reacted at 0 to 130° C., preferably 50 to 130° C., more preferably 50 to 100° C. for 1 minute to 100 hours, preferably 30 minutes to 10 hours, more preferably 30 minutes to 5 hours. To the suspension thus obtained is brought into contact with component (b) at −20 to 100° C., preferably −10 to 90° C., more preferably −5 to 80° C. and reacted at 0 to 130° C., preferably 50 to 130° C., more preferably 60 to 120° C. for 1 to 600 minutes, preferably 10 to 500 minutes, more preferably 30 to 400 minutes. In the procedure, before or after the suspension is brought into contact with component (b), one or two or more of component (c) is contacted at −20 to 130° C., preferably −10 to 120° C., more preferably −5 to 110° C. to obtain a solid product. The solid product may be washed with a hydrocarbon compound, which is liquid at a room temperature. Preferably, the solid product is brought into contact and reacted with component (b) in the presence of component (d) at 0 to 130° C., preferably 50 to 130° C., more preferably 60 to 120° C. for 1 to 600 minutes, preferably 10 to 500 minutes, more preferably 30 to 400 minutes. In the procedure, one or more of component (c) is preferably brought into contact with the solid product before or after components (b) is brought into contact with the solid product. In any step of the foregoing procedure, a polysiloxane may be added, if necessary. The solid product is washed with a hydrocarbon compound which is liquid at a room temperature to obtain solid catalyst component (A).

(3) One or more of components (a) and (c) is suspended in component (d) at −20 to 100, preferably −10 to 90° C., more preferably −5 to 80° C. To the suspension, component (b) is brought into contact and reacted at 0 to 130° C., preferably 50 to 130° C., more preferably 60 to 120° C. for 1 to 600 minutes, preferably 10 to 500 minutes, more preferably 30 to 400 minutes to obtain a solid product. In the procedure, before or after the suspension is brought into contact with component (b), one or more of component (c) may be further contact at −20 to 130° C., preferably −10 to 120° C., more preferably −5 to 110° C. The solid product may be washed with a hydrocarbon, which is liquid at a room temperature. After the solid product is suspended in component (d), the solid product is brought into contact with component (e) at −20 to 130° C., preferably −10 to 100° C., more preferably 0 to 80° C. Preferably, the solid product is brought into contact with component (b) at 0 to 130° C., preferably 50 to 130° C., more preferably 60 to 120° C. for 1 to 600 minutes, preferably 10 to 500 minutes, more preferably 30 to 400 minutes. In the procedure, the solid product is preferably brought into contact with one or more of component (c) before or after the solid product is brought into contact with component (b). In any step of the foregoing procedure, a polysiloxane may be added, if necessary.

The proportion of amount of each compound to be used in the preparation of solid catalyst component (A) is not specifically limited because it is differed depending on the preparation method. Specific examples of the proportion of component (b) is from 0.5 to 100 mols, preferably from 0.5 to 50 mols, more preferably from 1 to 10 mols per mol of component (a). The proportion of component (c) is from 0.001 to 10 mols, preferably from 0.01 to 1 mol, more preferably from 0.02 to 0.6 mol per mol of component (a). The proportion of component (d) is 0.001 mol or more, preferably from 0.001 to 100 mols, more preferably from 0.005 to 10 mols per mol of component (a). In the case that an organic aluminum compound containing a hydroxyl group is used as component (e), the proportion of component (e) is 0.0005 to 0.1 mol, preferably 0.0008 to 0.08 mol, more preferably 0.001 to 0.06 mol per mol of component (a) and 0.0005 to 0.1 mol, preferably 0.0007 to 0.05 mol, more preferably 0.001 to 0.03 mol per mol of component (b). In the case that aluminum hydroxide is used as component (e), the proportion of component (e) is 0.00005 to 0.12 mol, preferably 0.00008 to 0.1 mol, more preferably 0.0001 to 0.08 mol per mol of component (a) and 0.00005 to 1 mol, preferably 0.00007 to 0.5 mol, more preferably 0.0001 to 0.1 mol per mol of component (b). In the present invention, component (e) prefers to use within the foregoing range. In case that the amount of component (e) is lower than the foregoing range, the effect for a high stereoregularity as the present invention is difficult to obtain, and in case that the amount of component (e) is higher, an activity and a stereoregularity would be deteriorated. Particularly, the proportion of hydroxyl group in component (e) per component (a) or component (b) is important. Specifically, the proportion of the hydroxyl group in component (e) is 0.00005 to 0.36 mol, preferably 0.00008 to 0.3 mol, more preferably 0.0001 to 0.24 mol per mol of component (a) and 0.00015 to 3 mols, preferably 0.00021 to 1.5 mols, more preferably 0.0003 to 0.3 mol per mol of component (b).

In the preparation process described above, preferably, diethoxymagnesium and dipropoxymagnesium are used as component (a), titanium tetrachloride is used as component (b), one or more of a phthalic diester, preferably diethyl phthalate, di-n-propyl phthalate, di-n-butyl phthalate, di-iso-butyl phthalate, di-n-octyl phthalate, bis (2-ethylhexyl) phthalate and di-iso-decyl phthalate is used as component (c) and toluene or xylene are used as component (d).

The most preferable combinations of component (a) to (e) of the present invention are as follows;
(1) diethoxymagnesium, titanium tetrachloride, di-n-butyl phthalate, toluene and $(C_{17}H_{35}CO_2)_2Al(OH)$ or $Al(OH)_3$;
(2) diethoxymagnesium, titanium tetrachloride, diethyl phthalate, bis(2-ethylhexyl)phthalate, toluene, and $(C_{17}H_{35}CO_2)Al(OH)$ or $Al(OH)_3$.

As the organic aluminum compound (B) to be used to form a catalyst for polymerization of olefins of the present invention, there may be used one represented by the general formula: $R^2_pAlQ_{3-p}$ (in which $R^2$ represents a $C_{1-4}$-alkyl group; Q represents a hydrogen atom or a halogen atom; and p represents a real number of more than 0 to not more than 3). Specific examples of the organic aluminum compound (B) include triethylaluminum, diethylaluminum chloride, tri-iso-butyl-aluminum, diethylaluminum bromide, and diethylaluminum hydride. These organic aluminum compounds may be used singly or in combination of two or more of them. Preferred among these organic aluminum compounds are triethylaluminum, and tri-iso-butylaluminum.

As the organic silicon compound (C) to be used to form a catalyst for polymerization of olefins of the present invention, there may be used a compound represented by the general formula $R^3_qSi(OR^4)_{4-q}$, (in which $R^3$ may be the same or different and represents a $C_{1-12}$-alkyl, cycloalkyl, phenyl, vinyl, allyl or aralkyl group; $R^4$ may be the same or different and represents a $C_{1-4}$-alkyl, cycloalkyl, phenyl, vinyl, allyl or aralkyl group; and q represents 0 or an integer of from 1 to 3). Specific examples of the organic silicon compound (C) include phenylalkoxysilane, alkylalkoxysilane, phenylalkylalkoxysilane, cycloalkylalkoxysilane and cycloalkylalkylalkoxysilane.

Specific examples of the foregoing organic silicon compound include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl)dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl)dimethoxysilane, cyclohexyl(n-pentyl)dimethoxysilane, cyclohexyl(n-pentyl)diethoxysilane, cyclopentyl(iso-butyl)dimethoxysilane, cyclohexyl(n-propyl)dimethoxysilane, cyclohexyl(n-propyl)diethoxysilane, cyclohexyl(n-butyl)diethoxysilane, cyclohexyl(iso-butyl)dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldiethylmethoxysilane, cyclohexyldiethylethoxysilane, 2-ethylhexyltrimethoxysilane, 2-ethylhexyltriethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyl-dimethoxysilane, 3,5-dimethylcyclohexylcyclopentyldimethoxysilane, 3-methylcyclohexylcyclohexyldimethoxysilane, bis(3-methylcyclohexyl)dimethoxysilane, 4-methylcyclohexylcyclohexyldimethoxysilane, bis-(4-methylcyclohexyl)dimethoxysilane, 3,5-dimethylcyclohexylcyclohexyldimethoxysilane, bis(3,5-dimethylcyclohexyl)dimethoxysilane, tetramethoxysilane, tetraethoxysilane, tetrapropoxysilane and tetrabutoxysilane. Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilene, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldiethoxysilane, cyclohexylethyldiethoxysilene, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyliethoxysilane, 3-methylcyclohexylcyclopentyldimethoxysilan, 4-methylcyclohexylcyclopentyldimethoxysilane, and 3,5-dimethylcyclopentyldimethoxysilane. These organic silicon compounds (C) may be used singly or in combination of two or more of them.

In the polymerization process of the present invention, the polymerization of olefins is accomplished by the polymerization or copolymerization of olefins in the presence of a catalyst made of the foregoing solid catalyst component (A), organic aluminum compound (B) and organic silicon compound (C). The ratio of the various components to be used is arbitrary and not specifically limited unless the effects of the present invention are impaired. In general, the proportion of the organic aluminum compound (B) is from 1 to 5,000 mols, preferably from 10 to 2000 mols, more preferably 50 to 1000 mols, per mol of titanium atom in the solid catalyst component (A). The proportion of the organic silicon compound (C) is from 0.002 to 10 mols, preferably from 0.01 to 2 mols, more preferably from 0.01 to 0.5 mol per mol of the component (B).

The order of contact of each component is arbitrary. Preferably, organic aluminum compound (B) is charged first into a polymerization system, and then brought into contact with organic silicon compound (C), and further contact with solid catalyst component (A).

The process for polymerization of the present invention may be carried out in the presence or absence of an organic solvent. The olefin monomer to be polymerized may be used in either a gaseous state or a liquid state. Further, hydrogen may be used during the polymerization as a molecular weight control agent. The polymerization temperature is not higher than 200° C., preferably not higher than 100° C. The polymerization pressure is not higher than 10 MPa, preferably not higher than 5 MPa. The continuous polymerization process or batchwise polymerization process may be applied. Further, the polymerization reaction may be carried out in one step or two or more steps.

The olefins to be homopolymerized or copolymerized by the process of the present invention include long chain olefins such as ethylene, propylene, 1-butene, 1-pentene, 1-hexene, 1-heptene, 1-octene and 1-decene, branched olefins such as 3-methyl-1-butene and 4-methyl-1-pentene, dienes such as butadiene, vinylcyclopentene and vinylcyclohexane. These olefins may be used singly or in combination of two or more of them. Among these olefins, ethylene and propylene are preferably used.

The polymerization (hereinafter referred as "main polymerization") of olefins in the presence of the catalyst made of the foregoing solid catalyst component (A), organic aluminum compound (B) and organic silicon compound (C) in the present invention is preferably preceded by prepolymerization to further enhance the catalytic activity and the stereoregularity, particle properties of the polymer thus produced and the like. As the monomers to be used in the prepolymerization there may be used the same olefins as main polymerization as well as monomers such as styrene.

In the prepolymerization, the order of contact for each component and monomer is arbitrary. Preferably, the organic aluminum compound (B) is charged into the prepolymerization system set up to the atmosphere of inert gas or olefin gas to be polymerized, and after contacting with the solid catalyst component (A), brought into contact with one or more olefins. In the case of conducting prepolymerization on combination with the organic silicon compound (C), preferably, the organic aluminum compound (B) is charged into the prepolymerization system set up to the atmosphere of inert gas or olefin gas to be polymerized, and after contacting with the organic silicon compound (C) and further the solid catalyst component (A), and then brought into contact with one or more olefins. In the prepolymerization, a molecular weight control agent, e.g., hydrogen may be added.

The present invention will be further described in the following examples as compared with the comparative examples.

(Evaluation of Properties)

The evaluation of slurry polymerization of propylene and slurry random copolymerization of propylene and ethylene were conducted by using the catalyst for polymerization of olefins of the present invention, and a total amount of polymer per g of solid catalyst component (a polymerization activity: Yield) and a ratio of an amount of polymer undissolved when the polymer was extracted with boiling n-heptane per whole polymer (HI) and rate of forming a polymer which is soluble in a polymerization solvent (Rate of forming soluble matter) were measured. Yield, HI and rate of forming soluble matter were calculated by the following equation. Further, with regard to the polymer produced, melt flow rate (MI), bulk density (BD) and content of ethylene (only for copolymer) were measured. The measurement methods of MI and BD were conducted in accordance with JIS K 7210 and JIS K 6721 respectively. The content of ethylene was measured by FT-IR (Fourier transformation infrared spectroscopic analyzer) made by Nihon Electric Datum Company, JIR-RFX3001.

Yield(g–PP·g–cat.)={a(g)+c(g)}·catalyst component (g)

HI(wt. %)={b(g)·a(g)}×100

Rate of forming soluble matter (wt. %)=(c(g)·{a(g)+c(g)})×100

In the equations above, a shows a weight of polymer produced after termination of polymerization reaction, b shows a weight of n-heptane undissolved polymer when polymer produced after termination of polymerization reaction was extracted with boiling n-heptane for 6 hours by the high-temperature type Soxhlet's extractor, and shows an amount of polymer dissolved in a polymerization solvent filtrated after termination of polymerization reaction.

EXAMPLE 1

<Preparation of solid catalyst component (A)>

Into a 2000-ml round flask equipped with an agitator in which the air within had been thoroughly replaced by nitrogen gas were charged 100 g of diethoxymagnesium and 800 ml of toluene, and then 200 ml of titanium tetrachloride was charged. The mixed solution was subjected to aging reaction by agitation for 1 hour maintaining the temperature of 30° C. 52 ml of bis(2-ethylhexyl)phthalate, 2.0 ml of diethyl phthalate and 40 ml of polysiloxane (TSF451-100, product made by Toshiba Silicon) were added to the mixture at 50° C., 70° C. and 85° C. respectively. The temperature of the reaction system was raised to 110° C. and then reacted for 1.5 hours with stirring. After the termination of the reaction, a supernatant was removed and 800 ml of toluene and 200 ml of titanium tetrachloride were newly added to the reaction system and reacted at 110° C. for 15 minutes. The resulting reaction product was then washed with toluene and were added 800 ml of toluene, 200 ml of titanium tetrachloride and 18.5 g (0.034 mol of ALSTE per 1 mol of diethoxymagnesium and 0.017 mol per a mol of titanium tetrachloride) of ALSTE (di-type) (aluminum stearate made by Seido Chemical Industries Co. Ltd., which is a mixture of $(C_{17}H_{35}CO_2)_3Al$, $(C_{17}H_{35}CO_2)_2Al(OH)$ and $(C_{17}H_{35}CO_2)Al(OH)_2$ and the content of a free fatty acid is 18% against 4.0% of a metal.). The mixture was then heated to 100° C. and reacted 2 hours with stirring. Thereafter, the resulting solid reaction product was washed with n-heptane, separated by filtration and dried to obtain a powdered solid catalyst component (A). The solid catalyst component (A) was then measured for Ti content. The result was 2.00% by weight.

<Polymerization>

Into a 1500 ml autoclave equipped with an agitator in which the air within had been completely replaced by nitrogen gas were charged 700 ml of n-heptane and then charged 2.1 mmol of triethylaluminum, 0.21 mmol of cyclohexylmethyldimethoxysilane and the foregoing solid catalyst component (A) in an amount of 0.0053 mmol as calculated in terms of titanium atom with stirring to form a polymerization catalyst. Thereafter, the polymerization system was pressured with a propylene gas to 0.1 MPa, and allowed to undergo prepolymerization at a temperature of 20° C. for 30 minutes. Into the autoclave were then charged 80 ml of hydrogen gas and pressured with a propylene gas to 0.6 MPa and allowed to main polymerization at a temperature of 70° C. for 2 hour. The results of the evaluation of polymerization are set forth in Table 1.

EXAMPLE 2

The procedure of Example 1 was followed to effect the preparation of a solid catalyst component (A) and the polymerization evaluation thereof except that the amount of ALSTE to be used was 9.3 g (0.017 mol of ALSTE per 1 mol of diethoxymagnesium and 0.084 mol per a mol of titanium tetrachloride). Ti content of the resulting solid catalyst component (A) was 1.99% by weight. The results are set forth in Table 1.

EXAMPLE 3

The procedure of Example 1 was followed to effect the preparation of a solid catalyst component (A) and the polymerization evaluation thereof except that the amount of ALSTE to be used was 4.6 g (0.0086 mol of ALSTE per 1 mol of diethoxymagnesium and 0.0041 mol per a mol of titanium tetrachloride). Ti content of the resulting solid catalyst component (A) was 1.92% by weight. The results are set forth in Table 1.

EXAMPLE 4

The procedure of Example 1 was followed to effect the preparation of a solid catalyst component (A) and the polymerization evaluation thereof except that the amount of ALSTE to be used was 1.2 g (0.0022 mol of ALSTE per 1 mol of diethoxymagnesium and 0.0011 mol per a mol of titanium tetrachloride). Ti content of the resulting solid catalyst component (A) was 1.72% by weight. The results are set forth in Table 1.

EXAMPLE 5

<Preparation of solid catalyst component (A)>

Into a 2000-ml round flask equipped with an agitator in which the air within had been thoroughly replaced by nitrogen gas were charged 100 g of diethoxymagnesium and 800 ml of toluene, and then 200 ml of titanium tetrachloride was charged. The mixed solution was subjected to aging reaction by agitation for 1 hour maintaining the temperature of 30° C. 52 ml of bis(2-ethylhexyl)phthalate, 2.0 ml of diethyl phthalate and 40 ml of polysiloxane (TSF451-100, product made by Toshiba Silicon) were added to the mixture at 50° C., 70° C. and 85° C. respectively. The temperature of the reaction system was raised to 110° C. and then reacted for 1.5 hours with stirring. After the termination of the reaction, a supernatant was removed and 800 ml of toluene and 200 ml of titanium tetrachloride were newly added to the reaction system and reacted at 110° C. for 15 minutes. The resulting reaction product was then washed with toluene and were added a suspended liquid suspended 4.6 g (0.0086 mol of ALSTE per 1 mol of diethoxymagnesium and 0.0041 mol per a mol of titanium tetrachloride) of ALSTE with 800 ml of toluene and 200 ml of titanium tetrachloride. The mixture was then heated to 100° C. and reacted for 2 hours with stirring. Thereafter, the resulting solid reaction product was washed with n-heptane, separated by filtration and dried to obtain a powdered solid catalyst component (A). The solid catalyst component was then measured for Ti content. The result was 1.82% by weight.

<Polymerization>

The procedure of Example 1 was followed to effect the polymerization evaluation. The results are set forth in Table 1.

EXAMPLE 6

The procedure of Example 3 was followed to effect the preparation of a solid catalyst component (A) and the polymerization evaluation thereof except that after 4.6 g of ALSTE was suspended with 54 ml of n-heptane, and the suspension was added to 800 ml of toluene and then contacted with 200 ml of titanium tetrachloride. Ti content of the resulting solid catalyst component (A) was 2.08% by weight. The results are set forth in Table 1.

EXAMPLE 7

(Preparation of solid catalyst component)

The procedure of Example 1 was followed to effect the preparation of a solid catalyst component thereof except that 0.2 g of aluminum hydroxide (0.0029 mol per mol of diethoxymagnesium and 0.0014 mol per mol of titanium tetrachloride) was used instead of ALSTE. Ti content of the resulting solid catalyst component (A) was 1.65% by weight. The results are set forth in Table 1.

<Polymerization>

The procedure of Example 1 was followed to effect the polymerization evaluation. The results are set forth in Table 1.

EXAMPLE 8

The procedure of Example 7 was followed to effect the preparation of a solid catalyst component and the polymerization evaluation thereof except that the amount of aluminum hydroxide to be used was 0.02 g (0.00029 mol per 1 mol of diethoxymagnesium and 0.00014 mol per mol of titanium tetrachloride). Ti content of the resulting solid catalyst component (A) was 1.77% by weight. The results are set forth in Table 1.

EXAMPLE 9
<Preparation of solid catalyst component>

Into a 500-ml round flask equipped with an agitator in which the air within had been thoroughly replaced by nitrogen gas were charged 20 g of diethoxymagnesium, 160 ml of toluene and 1.4 g of aluminum hydroxide (0.10 mols per mol of diethoxymagnesium), and contacted and reacted at 90° C. for 2 hours with stirring, and then cooled to a room temperature. Thereafter, to the reaction mixture, 40 ml of titanium tetrachloride (0.05 mol of aluminum hydroxide per mol of titanium tetrachloride) was added and the temperature of the reaction system was raised and 5.7 ml of phthalic di-n-butyl was added at 80° C. The temperature of the reaction system was raised to 110° C. and then reacted for 2 hours with stirring. After the termination of the reaction, a supernatant was removed, the solid product was washed with toluene, and then 160 ml of toluene and 40 ml of titanium tetrachloride were newly added to the reaction system and reacted at 100° C. for 1.5 hours. Thereafter, the resulting solid reaction product was washed with toluene, separated by filtration and dried to obtain a powdered solid catalyst component (A). The solid catalyst component (A) was then measured for Ti content. The result was 2.66% by weight.
<Polymerization>

The procedure of Example 1 was followed to effect the polymerization evaluation. The results are set forth in Table 1.

COMPARATIVE EXAMPLE 1
<Preparation of solid catalyst component (A)>

Into a 2000-ml round flask equipped with an agitator in which the air within had been thoroughly replaced by nitrogen gas were charged 100 g of diethoxymagnesium, 800 ml of toluene and then 200 ml of titanium tetrachloride. Thereafter, 27 ml of dibutyl phthalate was added to the mixture. The temperature of the reaction system was raised to 110° C. and then reacted for 2 hours with stirring. After the termination of the reaction, the reaction product was washed with toluene and 800 ml of toluene and 200 ml of titanium tetrachloride were newly added to the reaction system and reacted at 1a0° C. for 1.5 hours with stirring. Thereafter, the resulting reaction product was washed with n-heptane, separated by filtration and dried to obtain a powdered solid catalyst component (A). The solid catalyst component (A) was then measured for Ti content. The result was 2.24% by weight.
<Polymerization>

The procedure of Example 1 was followed to effect the polymerization evaluation. The results are set forth in Table 1.

COMPARATIVE EXAMPLE 2

The procedure of Example 1 was followed to effect the preparation of a solid catalyst component (A) and the polymerization evaluation thereof except that 10 g of $AlCl_3$ was used instead of ALSTE. The solid catalyst component was then measured for Ti content. The result was 2.73% by weight. The results are set forth in Table 1.

COMPARATIVE EXAMPLE 3

The procedure of Example 1 was followed to effect the preparation of a solid catalyst component (A) and the polymerization evaluation thereof except that 18.5 g of $(C_{17}H_{35}CO_2)_3Al$ was used instead of ALSTE. The solid catalyst component was then measured for Ti content. The result was 1.92% by weight. The results are set forth in Table 1.

COMPARATIVE EXAMPLE 4

The procedure of Example 7 was followed to effect the preparation of a solid catalyst component and the polymerization evaluation thereof except that the amount of aluminum hydroxide to be used was 20 g (0.29 mol of aluminum hydroxide per mol of diethoxymagnesium and 0.14 mol per mol of titanium tetrachloride). The solid catalyst component (A) was then measured for Ti content. The result was 1.50% by weight. The results are set forth in Table 1.

COMPARATIVE EXAMPLE 5
<Preparation of solid catalyst component (A)>

Into a 1000-ml vibration mill pot filled with stainless balls having 25 mm of diameter in the amount of ⅘ of the whole volume of pot under nitrogen gas atmosphere were charged 5 g of aluminum hydroxide and 45 g of diethoxymagnesium (0.16 mol of aluminum hydroxide per mol of diethoxymagnesium) and made the grinding treatment at a room temperature for one hour at 1430 times/min. of frequency and 3.5 mm of amplitude of vibration. Into a 500-ml round flask equipped with an agitator in which the air within had been thoroughly replaced by nitrogen gas were charged 5.5 g of the foregoing grind product and 15 ml of ortho-dichlorobenzene and then charged 1.8 ml of dibutyl phthalate and 200 ml of titanium tetrachloride (0.035 mol of aluminum hydroxide per mol of titanium tetrachloride). The temperature of the reaction system was raised to 110° C. and then reacted for 2 hours with stirring. After the termination of the reaction, the reaction product was washed with heptane, and further washed with 200 ml of titanium tetrachloride. Then, 200 ml of titanium tetrachloride was newly added to the reaction system. The temperature of the system was raised to 110° C. and then reacted for 2 hours with stirring. Thereafter, the resulting product was washed with n-heptane, separated by filtration and dried to obtain a powdered solid catalyst component (A). The solid catalyst component (A) was then measured for Ti content. The result was 2.68% by weight.
<Polymerization>

The procedure of Example 1 was followed to effect the polymerization evaluation. The results are set forth in Table 1.

TABLE 1

| | Yield g-PP/g-cat. | H I wt. % | Rate of forming soluble matter wt. % | B D g/ml | M I g/10 min |
|---|---|---|---|---|---|
| EXAMPLE 1 | 19,600 | 99.3 | 0.26 | 0.38 | 4.8 |
| EXAMPLE 2 | 19,600 | 99.4 | 0.23 | 0.41 | 2.1 |
| EXAMPLE 3 | 19,300 | 99.4 | 0.20 | 0.40 | 2.3 |
| EXAMPLE 4 | 18,200 | 99.4 | 0.18 | 0.41 | 2.0 |

TABLE 1-continued

|  | Yield g-PP/g-cat. | H I wt. % | Rate of forming soluble matter wt. % | B D g/ml | M I g/10 min |
|---|---|---|---|---|---|
| EXAMPLE 5 | 18,100 | 99.3 | 0.27 | 0.40 | 3.6 |
| EXAMPLE 6 | 19,800 | 99.3 | 0.24 | 0.39 | 2.3 |
| EXAMPLE 7 | 19,700 | 99.3 | 0.19 | 0.40 | 2.8 |
| EXAMPLE 8 | 21,000 | 99.4 | 0.22 | 0.40 | 2.5 |
| EXAMPLE 9 | 21,900 | 99.1 | 0.26 | 0.37 | 3.0 |
| COMPARATIVE EXAMPLE 1 | 18,900 | 99.0 | 0.43 | 0.37 | 2.8 |
| COMPARATIVE EXAMPLE 2 | 19,900 | 96.4 | 1.85 | 0.37 | 3.6 |
| COMPARATIVE EXAMPLE 3 | 18,400 | 99.2 | 0.31 | 0.38 | 2.4 |
| COMPARATIVE EXAMPLE 4 | 16,300 | 88.1 | 8.02 | 0.32 | 3.0 |
| COMPARATIVE EXAMPLE 5 | 11,000 | 99.0 | 1.71 | 0.36 | 4.1 |

EXAMPLE 10

<Preparation of solid catalyst component>

The procedure of Example 7 was followed to effect the preparation of solid catalyst component.

<Polymerization>

Into a 2200 ml autoclave equipped with an agitator in which the air within had been completely replaced by nitrogen gas were charged 700 ml of n-heptane and then charged 2.1 mmol of triethylaluminum, 0.21 mmol of cyclohexylmethyldimethoxysilane and the foregoing solid catalyst component (A) in an amount of 0.0035 mmol as calculated in terms of titanium atom with stirring to form a polymerization catalyst. Thereafter, the polymerization system was pressured with a propylene gas to 0.1 MPa with supplying propylene continuously at the rate of 5.0 Nl/min., and allowed to undergo prepolymerization at a temperature of 30° C. for 30 minutes. Into the autoclave were then charged ethylene gas at the rate of 0.30 NL/min. and hydrogen gas at the rate of 0.15 NL/min. continuously without stopping supplying propylene and pressured to 0.4 MPa and allowed to main polymerization at a temperature of 70° C. for 2 hours. The results of the evaluation of polymerization are set forth in Table 2.

EXAMPLE 11

<Preparation of solid catalyst component>

Into a 2000-ml round flask equipped with an agitator in which the air within had been thoroughly replaced by nitrogen gas were charged 100 g of diethoxymagnesium and 800 ml of toluene, and then 200 ml of titanium tetrachloride was charged. The mixed solution was conducted the aging reaction by agitated for 1 hour maintaining the temperature of 30° C. 52 ml of bis(2-ethylhexyl)phthalate, 11 ml of diethyl phthalate and 40 ml of polysiloxane (TSF451-100, product made by Toshiba Silicon) were added to the mixture at 50° C., 70° C. and 85° C. respectively. The temperature of the reaction system was raised to 110° C. and then reacted for 1.5 hours with stirring. After the termination of the reaction, a supernatant was removed and 800 ml of toluene and 200 ml of titanium tetrachloride were newly added to the reaction system and reacted at 110° C. for 15 minutes. The resulting reaction product was then washed with toluene and were added 600 ml of toluene and the suspension of aluminum hydroxide with toluene (0.2 g of aluminum hydroxide per 200 ml of toluene) (0.0029 mol of aluminum hydroxide per mol of diethoxymagnesium). Thereafter, to the mixture, 200 ml of titanium tetrachloride (0.0014 mol of aluminum hydroxide per mol of titanium tetrachloride) and 2.5 ml of diethyl phthalate were added at 80° C. and then heated to 100° C. and reacted 2 hours with stirring. The resulting reaction product was washed with n-heptane, separated by filtration and dried to obtain a powdered solid catalyst component (A). The solid catalyst component (A) was then measured for Ti content. The result was 2.13% by weight.

<Polymerization>

The procedure of Example 10 was followed to effect the polymerization evaluation. The results are set forth in Table 2.

COMPARATIVE EXAMPLE 6

The procedure of comparative Example 1 was followed to effect the preparation of solid catalyst component and the procedure of Example 10 was followed to effect the polymerization evaluation. The results are set forth in Table 2.

COMPARATIVE EXAMPLE 7

<Preparation of solid catalyst component>

The procedure of Comparative Example 1 was followed to effect the preparation of a solid catalyst component and the procedure of Example 10 was followed to effect the polymerization evaluation thereof except that the flow rate of ethylene was 0.2 NL/min. The results are set forth in Table 2.

TABLE 2

|  | Yield g-PP/g-cat. | H I wt. % | Rate of forming soluble matter wt. % | B D g/ml | Content of ethylene wt. % |
|---|---|---|---|---|---|
| EXAMPLE 10 | 19,000 | 96.9 | 1.1 | 0.36 | 2.3 |
| EXAMPLE 11 | 22,000 | 98.5 | 1.5 | 0.34 | 2.7 |
| COMPARATIVE EXAMPLE 6 | 15,200 | 80.0 | 9.2 | 0.31 | 3.2 |
| COMPARATIVE EXAMPLE 7 | 12,300 | 95.9 | 3.3 | 0.34 | 2.4 |

INDUSTRIAL APPLICABILITY

In case that olefins are allowed to conduct polymerization by slurry process in the presence of catalyst for polymerization of olefins of the present invention, the rate of forming a polymer which is soluble in a polymerization solvent can decrease in ⅔ to ¹/₁₀, with maintaining a catalyst activity and a stereoregularity and a bulk density of the resulting polymer in a high level in comparison with the case that a conventional catalyst was used. Further, in a copolymerization of olefins, comparing with the case that a polymer having the same ethylene content is produced by using a conventional catalyst, the rate of forming a soluble matter in a polymerization solvent can decrease ½ or less. As the result, the improvement of process operability and production cost in the production of polyolefin can be achieved.

What is claimed is:

1. A solid catalyst component for polymerization of olefins prepared by contacting components consisting of the following components (a) to (e);

(a) an alkoxy magnesium compound, (b) a tetravalent halogen-containing titanium compound, (c) a diester of an aromatic dicarboxylic acid, (d) an aromatic hydrocarbon, (e) at least one aluminum compound selected from an organic aluminum compound containing a hydroxyl group represented by the following general formula (I) and aluminum hydroxide;

$$(R^1CO_2)_m Al(OH)_{3-m} \quad (I)$$

wherein m represents 1 or 2, $R^1$ represents hydrogen atom or a linear or branched saturated or unsaturated hydrocarbon group having 1 to 21 carbon atoms, and $CO_2$ represents —C(=O)—O—, and (f) polysiloxane;

wherein the amount of said organic aluminum compound (I) containing a hydroxyl group is 0.0005 to 0.1 mol per mol of a magnesium compound, and wherein the amount of said aluminum hydroxide is 0.00005 to 0.12 mol per mol of a magnesium compound.

2. A solid catalyst component for polymerization of olefins as in claim 1, wherein said magnesium compound is a dialkoxymagnesium.

3. A solid catalyst component for polymerization of olefins as in claim 1, wherein said aromatic hydrocarbon is toluene, xylene or ethylbenzene.

4. A solid catalyst component for polymerization of olefins as in claim 1, wherein $R^1$ of the general formula (I) of said organic aluminum compound containing a hydroxyl group is a $C_{15-21}$ linear or branched saturated hydrocarbon group.

5. A solid catalyst component for polymerization of olefins as in claim 1, wherein $R^1$ of the general formula (I) of said organic aluminum compound containing a hydroxyl group is a $C_{17}$ linear or branched saturated hydrocarbon group.

6. A solid catalyst component for polymerization of olefins as in claim 2, wherein said halogen-containing titaniun compound is a titanium compound represented by the general formula $Ti(OR^{12})_n X_{4-n}$ wherein $R^{12}$ represents a $C_{1-4}$-alkyl group; X represents a halogen atom such as chlorine, bromine and iodine; and n represents 0 or an integer of from 1 to 3.

7. A solid catalyst component for polymerization of olefins as in claim 1, wherein said component (e) is an organic aluminum compound containing a hydroxyl group.

8. A solid catalyst component for polymerization of olefins as in claim 1, wherein said component (e) is aluminum hydroxide.

9. A solid catalyst component for polymerization of olefins as in claim 6, wherein said component (e) is aluminum hydroxide.

10. A solid catalyst component for polymerization of olefins as in claim 1, wherein said solid catalyst component is prepared by contacting said component (e) with a reaction product of components (a), (b), (c) and (d) in the presence of (b) in the suspended state.

11. A solid catalyst component for polymerization of olefins as in claim 1, wherein said solid catalyst component is prepared by contacting component (b) after contacting said component (e) with component (a) or a reaction product of components (a), (b), (c) and (d) in the suspended state.

12. A catalyst for polymerization of olefins, prepared from the following components (A), (B) and (C):

(A) the solid catalyst component as defined in claim 1;
(B) an organic aluminum compound represented by the general formula:

$$R^2_p AlQ_{3-p}$$

wherein $R^2$ represents a $C_{1-4}$-alkyl group; Q represents a hydrogen atom or a halogen atom; and p represents a real number of more than 0 to not more than 3; and (C) an organic silicon compound represented by the general formula:

$$R^3_q Si(OR^4)_{4-q}$$

wherein $R^3$ may be the same or different and represents a $C_{1-12}$-alkyl, cycloalkyl, phenyl, vinyl, allyl or aralkyl group; $R^4$ may be the same or different and represents a $C_{1-4}$-alkyl, cycloalkyl, phenyl, vinyl, allyl or aralkyl group; and q represents 0 or an integer of from 1 to 3.

13. The solid catalyst component as claimed in claim 1, wherein said component (f) is a compound of the formula (IV)

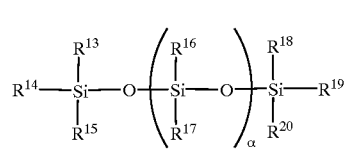

(IV)

wherein α represents an average polymerization degree of from 2 to 30,000 and $R^{13}$-$R^{20}$ each represents a methyl group, a phenyl group, a hydrogen atom, a $C_{10-20}$ higher fatty acid residue, an epoxy-containing group, or a $C_{1-10}$ polyoxyalkylene group.

14. The solid catalyst component as claimed in claim 1, wherein said polysiloxane is selected from the group consisting of dimethylpolysiloxane, methylphenyl polysiloxane, methyl hydrogen polysiloxane which is 10–80% hydrogenated, hexamethylcyclotri-siloxane, octamethylcyclotetrasiloxane, decamethylcyclopentylsiloxane, 2,4,6-trimethylcyclotrisiloxane, 2,4,6,8-tetramethylcylcotetrasiloxane, higher fatty acid-substituted dimethylsiloxane, epoxy-substituted dimethylsiloxane, and polyoxyalkylene-substituted dimethylsiloxane.

* * * * *